D. M. BERNARD.
COMBINATION DRAWING AND MEASURING INSTRUMENT.
APPLICATION FILED SEPT. 10, 1917.
1,307,076.
Patented June 17, 1919.
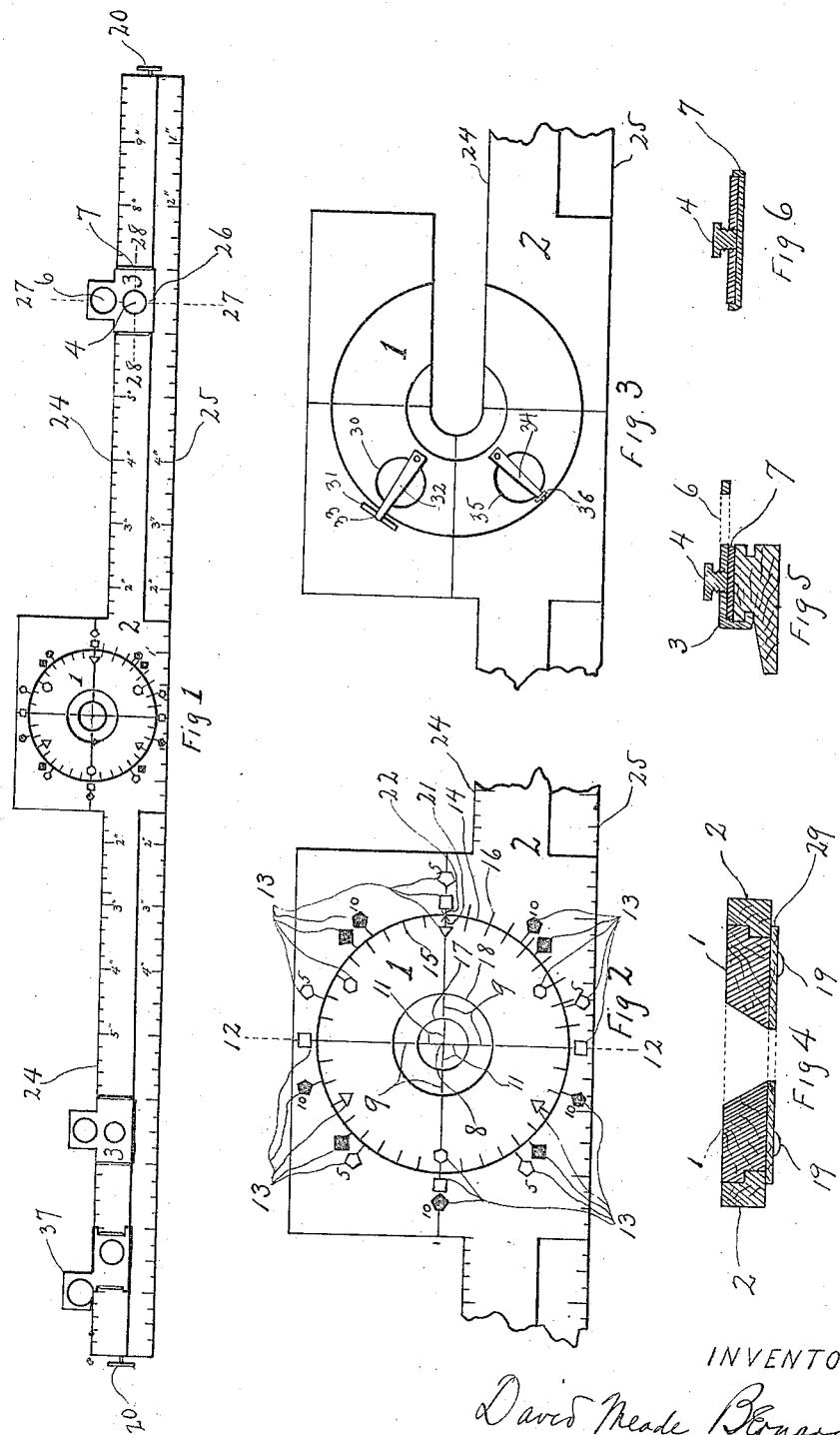
INVENTOR:
David Meade Bernard

UNITED STATES PATENT OFFICE.

DAVID MEADE BERNARD, OF JACKSONVILLE, FLORIDA.

COMBINATION DRAWING AND MEASURING INSTRUMENT.

1,307,076.  Specification of Letters Patent.  Patented June 17, 1919.

Application filed September 10, 1917. Serial No. 190,574.

*To all whom it may concern:*

Be it known that I, DAVID MEADE BERNARD, of the city of Jacksonville, in the county of Duval and State of Florida, have invented a new and useful Combination Drawing and Measuring Instrument; and I do hereby declare that the following is a full, clear, and exact description of the same, reference being had to the accompanying drawings, which form a part of this specification.

The invention relates to that class of instruments known as combination drawing and measuring instruments and more especially to straight edges, compasses and protractors.

The object sought is to provide a simple, convenient and comprehensive instrument which will be generally useful in the art of drafting. The design shown in said drawings is especially useful in black board work in the school room, this design constituting by reason of its shape an unusually convenient straight edge, by reason of its shape and manner of operation an unusually convenient protractor, by reason of its manner of operation an unusually convenient compass, giving radii of any desired lengths between certain minimum and maximum limits, avoiding slipping, exposing to view the center of the arc being drawn and measuring said arc as it is being drawn. It will also appear later that the instrument will enable me without the use of auxiliary lines to determine accurately and with ease the vertices of regular polygons of any desired radius between certain maximum and minimum limits, and to locate readily points symmetric with respect to a given point as a center.

Figure 1 is a top plan view of the instrument.

Fig. 2 is a top plan view of the mid portion of the instrument.

Fig. 3 shows in outline a modified form which that portion of the instrument shown in Fig. 2 may take.

Fig. 4 shows section 12—12 of Fig. 2.

Fig. 5 shows the section 27—27 of Fig. 1.

Fig. 6 shows the section 28—28 of Fig. 1.

Fig. 1 shows a circular disk, 1, perforated at its center, a limb 2 assembled with and capable of revolving about disk 1 and two slides, 3, which are engaged in and which slide along limb 2. The said slides can be made fast by means of the screw, 4, which presses against a thin sheet of metal, 7, lying between the said screw and limb, 2, and said slide contains a hole, 6, through which a crayon or other drawing implement may be inserted. On disk 1 adjacent to the circle of contact of disk 1 and limb 2, numbered 14, is placed a protractor scale, 15. A protractor scale, 16, (shown here only in one quadrant but which may be continued throughout the four quadrants) may be placed on limb 2 if desired. The instrument may contain either one or both of the said protractor scales. The use of the small polygons, 13, placed in close proximity to circle 14 will be explained later. All of the said polygons may be placed within, all without, or some within and some without the circumference of circle 14. Circle 17 represents the perimeter of the lower base of the perforation 8 at the center of disk 1 and circle 18 the perimeter of the upper base of said perforation. Lines 11 represent hair lines which may be used to place the center of the perforation 8 over any desired point. The line segments 9 running at right angles to each other and terminating at 17 may also be used to place the center over any desired point, the point having been made the intersection of a pair of rectangular axes. These segments intersect at the center of 8 when produced. If instead of perforating disk 1 at its center its central portion is made of transparent material its center may be placed over any desired point on the drawing surface either by lines which intersect at its center being marked thereon or by marking thereon a small dot at its center.

It is seen from Fig. 4 that the disk 1 may be held firmly against the drawing surface by the pressure of the fingers leaving the limb 2 free to revolve about said disk the said limb wholly escaping contact with the drawing surface during the process of revolution. If it is desired to have certain selected points of said limb to come in contact with the drawing surface during the process of revolution knobs such as shown at 19, Fig. 4 and of proper thickness may be placed at such selected points of said limb, or wheels may be placed at either one or both ends of said limb as shown at 20, Fig. 1.

If a crayon or marking implement is inserted through hole 6, Fig. 1, and held against the drawing surface during the process of revolution an arc or a circumference will be made to appear thereon. The fact that the limb 2 does not come in contact with the drawing surface (or except at certain selected points) avoids smearing and erasing of lines already drawn on said drawing surface as the said limb revolves about said disk.

In connection with the small polygons 13, Fig. 2, let it be observed that some polygons are shown in outline merely while others present a distinctive field throughout their entire surface and that some polygons of the same shape point differently with reference to the center of disk 1. By means of these distinguishing characteristics I am enabled to distinguish between different groups of polygons even though they may be of the same shape. I may further distinguish between polygons or groups of polygons of the same shape by making them of different sizes or of different colors or both.

To illustrate the use of these polygons let it be desired to determine the vertices of a regular triangle of given radius. First the slide 3, Fig. 1, is moved until the center of hole 6 of said slide is at the required distance from the center of the circular disk 1. This distance may be found by use of either scale 24 or 25. Press the disk 1 firmly against the drawing surface and revolve limb 2 until point 22, Fig. 2, of said limb is opposite a triangle on disk 1 (i. e. opposite the line leading from a triangle to the edge of said disk.) Insert a marking implement through hole 6 making a dot on the drawing surface. Revolve the instrument until the point 22 is opposite the next triangle and make a second dot on the drawing surface. Locate a third dot likewise. If a dot had been made on the drawing surface when the point 22 was opposite each of the small hexagons shown on said disk the vertices of a second triangle would have been located and the vertices of the two triangles thus located determine a regular hexagon. If I wish to determine a square I proceed similarly inserting the marking implement through hole 6 every time point 21 of disk 1 is opposite a square which points toward the center of disk 1. If I insert a marking implement every time the point 21 is opposite a square which does not point toward the center of disk 1 I locate the vertices of a second square, whose vertices taken with those of the first determine the vertices of a regular octagon. The two groups of small pentagons are used similarly to determine two regular pentagons which when taken together determine a regular decagon.

Numerals may be used instead of polygons if desired as is indicated by the numerals 5 and 10, Fig. 2, the fives locating the vertices of one pentagon and the tens (2x5) a second pentagon and the two together a regular decagon. If numerals were used instead of squares it would be convenient to use four fours and four eights. Likewise three threes and three sixes could be substituted for the triangles and hexagons respectively, the principle being this, that the numerals selected to locate the vertices of a regular polygon should correspond to the number of sides or vertices of the polygon or else be a multiple of the number of sides or vertices of the polygon.

Slide 3, Fig. 1, is engaged in limb 2 and slides with ease along said limb but may be clamped firmly to said limb by means of screw 4. The said slide contains a hole 6, the horizontal projection of the center of which with the horizontal projection of the center of said disk 1 determine a line parallel to the horizontal projection of the straight edges 24 and 25. A line 26 is placed on slide 3 for the purpose of alining the center of hole 6 with the divisions of the scales on straight edges 24 and 25. The straight edges 24 and 25 are preferably parallel and are shown to be so in Fig. 1. These straight edges may receive any desired scales. The graduations are preferably numbered from their centers outward as shown in Fig. 1. The straight edge 25 may have its divisions doubly numbered as is also shown in Fig. 1. A duplicate of slide 3 may be used to advantage in locating points symmetric with respect to a center and in locating the vertices of regular polygons of an even number of sides the slides having first been set equidistant from the center of circular disk 1. It may also be used to increase the range of the instrument as a compass.

The slide 3 shown in Fig. 1 and in section in Figs. 5 and 6 is especially well adapted to black board work. I do not wish however to limit my instrument to this simple slide. This instrument lends itself to most of if not all of the many slides now used in bar compasses, since limb 2 may be made to assume any desired shape. Especially do I wish to call attention to the fact that there are many different forms of springs and clamps which could be substituted for screw 4.

Disk 29, Fig. 4, is securely fastened by means of glue, screws or otherwise to disk 1 and in the description of the instrument above given has been looked upon as a part of disk 1.

If it is desired to have the disk 1 locked with reference to limb 2 in any particular position this result may be accomplished by the spring catch shown in Fig. 3. 30 is an indentation in the shape of a spherical segment. 32 is a strip of elastic metal which when lying flat on disk 1 has its end projecting into slot 33 in a piece of metal 31 which slopes away from the slot on either side to the surface of limb 2. When the finger is pressed on the spring 32 it bends the spring down into the indentation 30 and its end recedes from said slot leaving disk 1 free to turn with reference to limb 2.

Disk 1 may be kept constantly locked to limb 2 by means of spring 34, Fig. 3. Spring 34 is sunken flush with or slightly below the surface of disk 1 and presses constantly against the inner cylindrical surface of limb 2 except when it is pressed down into the indentation 35 at which time the pressure against said cylindrical surface ceases and limb 2 is left free to turn about disk 1. 36 is a strip of metal fastened to disk 1 which keeps the end of spring 34 from rising above the cylindrical surface of limb 2 when the spring 34 is pressed upon.

Slide 37, Fig. 1, shows a modified form of slide 3.

Reference is hereby made to application bearing the Serial Number 108,428 filed July 10, 1916, in which geometric figures are used to locate and designate points in a manner very similar to that in which they are used in this application.

The spring locks 32 and 34 shown in Fig. 3 were omitted from Figs. 1 and 2 to avoid complicating the drawing.

The central portion of straight edge 25 is not shown to be beveled. It may be beveled if desired.

Having thus described my invention, I claim:

1. A drafting instrument composed of a body portion, having a graduated straight edge, and a disk, said disk being pivotally secured in said body portion, and said instrument having thereon in close proximity to the outer edge of said disk small polygonal figures which designate points corresponding to the vertices of regular polygons and said instrument also having thereon a definitely determined point which coöperates with the said designated points and the divisions of said graduated straight edge to determine the vertices of regular polygons.

2. A drafting instrument composed of a body portion, a disk perforated at its center and pivotally secured in said body portion, and a slide, which slide moves freely along said body portion and which is capable of being firmly fastened to said body portion, said slide containing an opening designed to receive a marking implement, and said instrument having thereon in close proximity to the outer edge of said disk small polygonal figures which designate points corresponding to the vertices of regular polygons, and said instrument having thereon a definitely determined point which coöperates with the said designated points and the opening of said slide to determine the vertices of regular polygons substantially as described.

3. A drafting instrument composed of a body portion, a disk perforated at its center and pivotally secured in said body portion, and a slide, which slide moves freely along said body portion and which is capable of being firmly fastened to said body portion, said slide containing an opening designed to receive a marking implement, the center of the opening of said slide and the center of said disk determining a line substantially parallel to an edge of said body portion which said edge is straight and has thereat a linear scale, and said instrument having thereon in close proximity to the outer edge of said disk small polygonal figures which designate points corresponding to the vertices of regular polygons, and said instrument having thereon a definitely determined point which coöperates with the said designated points and the opening of said slide to determine the vertices of regular polygons substantially as described.

4. A drafting instrument composed of a body portion, having a graduated straight edge, and a disk, said disk being pivotally secured in said body portion, and said instrument having thereon in close proximity to the outer edge of said disk numerals which designate points corresponding to the vertices of regular polygons, the numeral designating each point being contained an integral number of times into the number of sides of the polygon one of whose vertices that point corresponds to, and said instrument having thereon a definitely determined point which coöperates with the said points and the divisions of said graduated straight edge to determine the vertices of regular polygons.

5. A drafting instrument composed of a body portion, a disk, perforated at its center and pivotally secured in said body portion, and a slide, which slide moves freely along said body portion and which is capable of being firmly fastened to said body portion, said slide containing an opening designed to receive a marking implement and said instrument having thereon in close proximity to the outer edge of said disk numerals which designate points corresponding to the vertices of regular polygons, the numeral designating each point being contained an integral number of times into the number of sides of the polygon one of whose vertices that point corresponds to, and said instrument having thereon a definitely determined point which coöperates with the said points and the opening of said slide to determine the vertices of regular polygons substantially as described.

6. A drafting instrument composed of a body portion, a disk perforated at its center and pivotally secured in said body portion, and a slide, which slide moves freely along said body portion and which is capable of being firmly fastened to said body portion, and said slide containing an opening designed to receive a marking implement, the center of the opening of said slide and the center of said disk determining a line substantially parallel to an edge of said body portion, which said edge is straight and has thereat a linear scale, and said instrument having thereon in close proximity to the outer edge of said disk numerals which designate points corresponding to the vertices of regular polygons, the numeral designating each point being contained an integral number of times into the number of sides of the polygon one of whose vertices that point corresponds to, and said instrument having thereon a definitely determined point which coöperates with the said points and the opening of said slide to determine the vertices of regular polygons substantially as described.

7. A drafting instrument composed of a body portion and a circular disk perforated at its center and serving as a pivot around which said body portion revolves, and said instrument having thereon in close proximity to the outer edge of said disk a protractor scale, and said instrument also having thereon a definitely determined point which coöperates with the divisions of said protractor scale to determine the angle through which said body portion revolves about said disk and said body portion having a graduated straight edge, the alinement of said straight edge being such as to direct the point of the marking implement for the use of which the said instrument is designed along a line which radiates from the center of said disk.

8. A drafting instrument composed of a body portion and a circular disk perforated at its center and serving as a pivot around which said body portion revolves, and a slide which moves freely along said body portion and which is capable of being firmly fastened to said body portion, and said slide containing an opening designed to receive a marking implement, and said instrument having thereon in close proximity to the outer edge of said disk a protractor scale, and said instrument also having thereon a definitely determined point which coöperates with the divisions of said protractor scale to determine the angle through which said body portion revolves about said disk.

9. A drafting instrument composed of a body portion and a circular disk perforated at its center and serving as a pivot around which said body portion revolves, and a slide which moves freely along said body portion and which is capable of being firmly fastened to said body portion, and said slide containing an opening designed to receive a marking implement, and said instrument having thereon in close proximity to the outer edge of said disk a protractor scale, and said instrument also having thereon a definitely determined point which coöperates with the divisions of said protractor scale to determine the angle through which said body portion revolves about said disk, and said body portion containing a graduated straight edge which coöperates with said slide substantially as described.

10. A drafting instrument composed of a body portion, and a circular disk perforated at its center and serving as a pivot around which said body portion revolves, and said instrument having thereon in close proximity to the outer edge of said disk a protractor scale and said instrument also having thereon a definitely determined point which coöperates with the divisions of the said protractor scale to determine the angle through which said body portion revolves about said disk, and said body portion having two limbs each containing a straight edge, each said straight edge being in alinement with the other, the inner end of each said straight edge lying outside of said disk and the alinement of the said straight edges being such as to direct the point of the marking implement for the use of which the said instrument is designed along lines which radiate from the center of said disk, the two said straight edges being similarly graduated, the corresponding main divisions of the graduations being similarly numbered and numbered with reference to their respective distances from the vertical axis of said instrument which passes through the center of said disk.

11. A drafting instrument composed of a body portion and a circular disk perforated at its center and serving as a pivot around which said body portion revolves, and a slide which moves freely along said body portion and which is capable of being firmly fastened to said body portion, and said slide containing an opening designed to receive a marking implement, and said instrument having thereon in close proximity to the outer edge of said disk a protractor scale, and said instrument having thereon a definitely determined point which coöperates with the divisions of said protractor scale to determine the angle through which said body portion revolves about said disk, and said body portion containing two limbs, substantially symmetric with respect to a vertical plane passing through the center of said disk, said limbs lying below a horizontal plane passing through the center of said disk and the lower edge of said limbs forming one continuous unobstructed straight edge, and the upper edges of said limbs being substantially parallel to said continuous straight edge and said disk lying between the inner extremities of said upper edges, and that part of said body portion lying above said horizontal plane forming a handle whereby said body portion can be held rigidly against the drawing surface.

12. A drafting instrument composed of a body portion and a circular disk perforated at its center and serving as a pivot around which said body portion revolves, and a slide which moves freely along said body portion and which is capable of being firmly fastened to said body portion, and said slide containing an opening designed to receive a marking implement, and said instrument having thereon in close proximity to the outer edge of said disk a protractor scale, and said instrument having thereon a definitely determined point which coöperates with the divisions of said protractor scale to determine the angle through which said body portion revolves about said disk, and said body portion containing two limbs, substantially symmetric with respect to a vertical plane which passes through the center of said disk, said limbs lying below a horizontal plane passing through the center of said disk and the lower edges of the said limbs forming one continuous unobstructed straight edge, and the upper edges of said limbs being substantially parallel to said continuous straight edge and said disk lying between the inner extremities of said upper edges, and that part of said body portion above said horizontal plane forming a handle whereby said body portion can be held rigidly against the drawing surface, and said continuous unobstructed straight edge being graduated symmetrically with respect to said vertical plane the main symmetric graduations being similarly numbered.

13. A drafting instrument composed of a body portion and a circular disk perforated at its center and serving as a pivot around which said body portion revolves, and a slide which moves freely along said body portion and which is capable of being firmly fastened to said body portion, and said slide containing an opening designed to receive a marking implement, and said instrument having thereon in close proximity to the outer edge of said disk a protractor scale, and said instrument having thereon a definitely determined point which coöperates with the divisions of said protractor scale to determine the angle through which said body portion revolves about said disk, and said body portion containing two limbs, substantially symmetric with respect to a vertical plane passing through the center of said disk and said limbs lying below a horizontal plane passing through the center of said disk, and the lower edges of the said limbs forming one continuous unobstructed straight edge, and the upper edges of said limbs being substantially parallel to said continuous straight edge, and said disk lying between the inner extremities of said upper edges, and that part of said body portion above said horizontal plane forming a handle whereby said body portion can be held rigidly against the drawing surface, and said continuous unobstructed straight edge being graduated symmetrically with respect to said vertical plane the main symmetric graduations being similarly numbered, and said continuous unobstructed straight edge having said main graduations also numbered consecutively from one end.

DAVID MEADE BERNARD.

Copies of this patent may be obtained for five cents each, by addressing the "Commissioner of Patents, Washington, D. C."